United States Patent [19]

Takida et al.

[11] Patent Number: 5,071,893

[45] Date of Patent: Dec. 10, 1991

[54] HALOGEN-CONTAINING THERMOPLASTIC RESIN COMPOSITION

[75] Inventors: Hiroshi Takida, Takatsuki; Takamasa Moriyama, Suita; Yoshimi Akamatu, Amagasaki; Makoto Kunieda, Hirakata, all of Japan

[73] Assignee: Nippon Gohsei Kagaku Kogyo Kabushiki Kaisha, Osaka, Japan

[21] Appl. No.: 694,606

[22] Filed: May 2, 1991

Related U.S. Application Data

[62] Division of Ser. No. 230,819, Aug. 11, 1988, Pat. No. 4,882,623.

[30] Foreign Application Priority Data

Aug. 14, 1987 [JP] Japan ............................... 62-203264
Dec. 20, 1987 [JP] Japan ............................... 62-323328

[51] Int. Cl.$^5$ ............................................... C08K 5/15
[52] U.S. Cl. ................................... 524/114; 524/127; 524/128; 524/186; 524/236; 524/284; 524/323; 524/357; 524/394; 524/313
[58] Field of Search ............... 524/394, 114, 127, 128, 524/186, 236, 284, 323, 357, 313

[56] References Cited

U.S. PATENT DOCUMENTS

| | | | |
|---|---|---|---|
| 3,560,461 | 2/1971 | Yonezu et al. | 525/62 |
| 3,560,465 | 2/1971 | Reynolds | 525/62 X |
| 3,890,267 | 6/1975 | Fukushima et al. | 524/151 |
| 3,975,463 | 8/1976 | Hirata et al. | 545/57 |
| 4,003,963 | 1/1977 | Creasy et al. | 525/57 |
| 4,041,223 | 8/1977 | Amemiya et al. | 525/62 |
| 4,349,644 | 9/1982 | Iwanami et al. | 525/27 |
| 4,367,305 | 1/1983 | Satoh et al. | 525/62 X |
| 4,613,533 | 9/1986 | Loomis et al. | 524/524 X |
| 4,719,259 | 1/1988 | Jenkins | 525/60 |
| 4,940,747 | 7/1990 | Eichenauer et al. | 524/524 X |

Primary Examiner—Joseph L. Schofer
Assistant Examiner—J. M. Reddich
Attorney, Agent, or Firm—Armstrong, Nikaido, Marmelstein, Kubovcik & Murray

[57] ABSTRACT

A halogen-containing thermoplastic resin composition comprising a halogen-containing thermoplastic resin (A), a metallic soap (B) and an ash- and alkali metal-lean ethylene-vinyl acetate copolymer hydrolysate (C) having an ethylene content of 20 to 75 mole percent, a degree of saponification not less than 50 mole percent, an ash content not exceeding 300 ppm and an alkali metal content not exceeding 200 ppm, the proportions of (B) and (C) based on 100 parts of weight by (A) being 0.1 to 5 parts by weight and 0.1 to 5 parts by weight, respectively. The composition may further include, in addition to (A), (B), and (C) mentioned above, at least one compound (D) selected from the group consisting of $\beta$-diketone compounds, organic phosphorous esters and aminocarboxylic acid compounds, the proportion of (D) based on 100 parts by weight of (A) being 0.05 to 5 parts by weight, and/or at least one compound (E) selected from the group consisting of phenol derivatives and epoxy compounds, the proportion of (E) based on 100 parts by weight of (A) being 0.01 to 5 parts by weight.

1 Claim, No Drawings

HALOGEN-CONTAINING THERMOPLASTIC RESIN COMPOSITION

This is a division of application Ser. No. 230,819 filed Aug. 11, 1988, now U.S. Pat. No. 4,882,623.

BACKGROUND OF THE INVENTION

The present invention relates to a halogen-containing thermoplastic resin composition with improved stability against initial coloration, discoloration on aging and blackening.

The halogen-containing thermoplastic resin, represented by polyvinyl chloride resin, gives rise, on heating for melt-molding purposes, to a polyene structure with elimination of hydrochloric acid, undergoing yellowing. To enhance the thermal stability of the resin, it has been common practice to incorporate a metallic soap as a stabilizer in the resin. However, since the incorporation of a stabilizer metallic soap alone may lead to the so-called metal burning in a prolonged melt-molding process, which causes blackening of the resin, it has been generally practiced to add an auxiliary stabilizer, such as polyols (e.g. pentaerythritol), organic phosphorous esters (e.g. triphenyl phosphite), epoxy compounds (e.g. bisphenol A type epoxy resin) and so on.

Aside from the above-mentioned technology, Japanese Unexamined Patent Application KOKAI 238345/1985 discloses a material sharing with the present invention some of resin components, although the prior art is not intended to enhance the thermal stability of halogen-containing thermoplastic resin.

Thus, the above-mentioned patent literature describes a resin composition consisting of (a) a thermoplastic resin (inclusive of polyvinyl chloride resin), (b) an ethylene-vinyl acetate copolymer hydrolysate, and (c) a salt or oxide containing at least one element selected from Groups I, II and III of Periodic Table of the Elements and mentions that this composition assures a marked improvement in compatibility.

In addition, Japanese Unexamined Patent Application KOKAI 69955/1977 discloses a polyvinyl chloride barrier packaging composition consisting essentially of a mixture of polyvinyl chloride and 10 to 30 weight percent, based on polyvinyl chloride, of an ethylenevinyl alcohol copolymer which shares some resin components with the composition of the present invention.

However, the use of a metallic soap as a stabilizer in combination with an auxiliary stabilizer has the disadvantage that where the auxiliary stabilizer is a polyol, the resulting composition is inadequate in compatibility and dispersibility so that the plate-out phenomenon (sticking of the batch to the roll) in the roll mixing stage inevitable, that where the auxiliary stabilizer is an organic phosphorous ester, it is hydrolyzed on absorption of moisture to lose its expected effect in part, and that where an epoxy compound is used as the auxiliary stabilizer, yellowing and plate-out cannot be sufficiently inhibited.

The composition described in Japanese Unexamined Patent Application KOKAI 238345/1985 is claimed to offer improved compatibility but has room for improvement in thermal stability.

The composition described in Japanese Unexamined Patent Application KOKAI 69955/1977 is conducive to reduced oxygen permeability with suppression of water vapor permeation but is poor in melt-moldability and in prevention of discloration, thus being of no great use in practical applications. Furthermore, since this composition is rich in ethylene-vinyl alcohol copolymer, the inherent characteristics of polyvinyl chloride resin are not available, thus delimiting its range of application.

The present invention has been accomplished to provide a halogen-containing thermoplastic resin composition having markedly improved thermal stability.

SUMMARY OF THE INVENTION

The present invention relates to a halogen-containing thermoplastic resin composition comprising a halogen-containing thermoplastic resin (A), a metallic soap (B) and an ash- and alkali metal-lean ethylene-vinyl acetate copolymer hydrolysate (C) having an ethylene content in the range of 20 to 75 mole percent, a degree of saponification not less than 50 mole percent, an ash content not more than 300 ppm and an alkali metal content not more than 200 ppm, the proportions of (B) and (C) based on 100 parts by weight of (A) being 0.1 to 5 parts by weight and 0.1 to 5 parts by weight, respectively.

In a preferred embodiment, the present invention relates to a halogen-containing thermoplastic resin composition which comprises, in addition to said halogen-containing thermoplastic resin (A), metallic soap (B) and ash- and alkali metal-lean ethylene-vinyl acetate copolymer hydrolysate (C) mentioned above, at least one compound (D) selected from the group consisting of β-diketone compounds, organic phosphorous esters and aminocarboxylic acid compounds, the proportion of (D) based on 100 parts by weight of (A) being 0.05 to 5 parts by weight.

In still another preferred embodiment, the halogen-containing thermoplastic resin composition of the invention further comprises, in addition to (A), (B), (C) and (D) mentioned above, at least one compound (E) selected from the group consisting of phenol derivatives and epoxy compounds, the proportion of (E) based on 100 parts by weight of (A) being 0.01 to 5 parts by weight.

DETAILED DESCRIPTION OF THE INVENTION

The present invention is described in detail below.

Halogen-Containing Thermoplastic Resin (A)

As examples of halogen-containing thermoplastic resin (A), there may be mentioned polyvinyl chloride resin, polyvinylidene chloride resin, chlorinated polyethylene, chlorinated polypropylene, chlorinated polyethylene-vinyl acetate copolymer and chlorosulfonated polyethylene. Particularly useful are polyvinyl chloride type resins, i.e. vinyl chloride homopolymer and copolymers of vinyl chloride with other comonomers.

Metallic Soap (B)

As examples of metallic soap (B), there may be mentioned Group II metal salts of higher fatty acids, resin acid, naphthenic acid and so on. As Group II metals, there may be mentioned magnesium, calcium, strontium, barium, zinc, cadmium and so on. Particularly useful are the salts of higher fatty acids, such as stearic acid, lauric acid, ricinolic acid, etc., with zinc, magnesium, calcium, barium or cadmium. Particularly, the zinc salts are especially effective and, therefore, it is preferable to use a higher fatty acid zinc salt at least in part. Moreover, while the metallic soaps mentioned above can be used singly, a greater stabilizing effect can be achieved by using two or more of them in combination.

Ethylene-Vinyl Acetate Copolymer Hydrolysate (C)

As the aforesaid ethylene-vinyl acetate copolymer hydrolysate (C), a copolymer having an ethylene content of 20 to 75 mole percent and a degree of saponification of its vinyl acetate unit not less than 50 mole percent is used.

Any ethylene-vinyl acetate copolymer whose composition is outside of the above range is insufficient to provide the desired degree of improvement in the thermal stability of halogen-containing thermoplastic resin (A). It should be understood that provided the copolymer composition is not deviant from the aforesaid range, (A) may include other comonomer units in a small proportion.

The ethylene-vinyl acetate copolymer hydrolysate (C) can generally be prepared by hydrolyzing (saponifying) an ethylene-vinyl acetate copolymer with the aid of an alkali catalyst. However, the industrial water and reagents used generally contain metal salts as impurities and the saponification catalyst (an alkali metal hydroxide) remains as the alkali metal acetate after the reaction, with the result that such impurities and alkali metal acetate tend to be contained in the saponified polymer separated by precipitation or filtration from the saponification reaction mixture. Though it depends on various factors such as the ethylene content of the resin, degree of saponification, conditions of saponification reaction, etc., the ash and alkali metal contents of the ethylene-vinyl acetate copolymer hydrolysate so obtained are usually about 5,000 to 50,000 ppm and about 4,000 to 40,000 ppm, respectively.

The terms 'ash content' are used herein to mean the value found as follows. The ethylene-vinyl acetate copolymer hydrolysate is dried, taken in a platinum evaporating dish and carbonized by means of an electric heater and a gas burner. The carbonized resin is then charged into an electric furnace at 400° C. The furnace temperature is then increased to 700° C., at which temperature it is thoroughly reduced to ashes over 3 hours. The ashes are taken out from the furnace, allowed to cool over 5 minutes and further allowed to stand in a desiccator for 25 minutes. Finally, the ashes were accurately weighed.

The terms 'alkali metal content' are used herein to mean the value found as follows. After the ethylene-vinyl acetate copolymer hydrolysate is reduced to ashes as in the determination of ash content, the ashes are dissolved in an aqueous solution of hydrogen chloride under warming and the solution is subjected to atomic absorption spectrometry.

The ethylene-vinyl acetate copolymer hydrolysate (C) to be used in accordance with the invention preferably has an ash content, as determined by the above procedure, not more than 300 ppm, more desirably not more than 50 ppm, and for still better results not more than 20 ppm and an alkali metal content, also as determined by the above-described procedure, not more than 200 ppm, more desirably not more than 35 ppm, and for still better results not more than 5 ppm. The lower is the ash content or/and the alkali metal content, the more pronounced is the effect on thermal stability, particularly in terms of prevention of initial coloration. The ash and alkali metal contents are preferably as low as possible within the respective ranges mentioned above but because of various limitations imposed on purification in commercial production, the practical lower limits are about 1 ppm for ashes and about 0.5 ppm for alkali metal.

The aforementioned ash- and alkali metal-lean ethylene-vinyl acetate copolymer hydrolysate (C) can be prepared as follows. The powders, granules or pellets of ethylene-vinyl acetate copolymer hydrolysate obtained by said saponification reaction are washed thoroughly with an aqueous solution of acid, preferably a weak acid, to remove the salt responsible for said ashes and alkali metal and are then preferably rinsed (with deionized water; the same applies hereinafter) to remove the absorbed acid from the resin and dried.

As examples of the weak acid mentioned above, there may be employed acetic acid, propionic acid, glycolic acid, lactic acid, adipic acid, azelaic acid, glutaric acid, succinic acid, benzoic acid, isophthalic acid, terephthalic acid and so on. Generally, a weak acid with a pKa value not less than 3.5 at 25° C. is preferred.

After the above weak acid treatment and either before or after rinse, there is preferably carried out a further treatment with a dilute aqueous solution of strong acid, for example an organic acid with a pKa value not exceeding 2.5 at 25° C., such as oxalic acid, maleic acid, etc., or mineral acids such as phosphoric acid, sulfuric acid, nitric acid, hydrochloric acid and so on. By this strong acid treatment, removal of the alkali metal can be made more effectively.

Compound (D)

As compound (D), at least one compound selected from the group consisting of β-diketone compounds, organic phosphorous esters and aminocarboxylic acid compounds is employed.

The aforesaid β-diketone compounds include, among others, dibenzoylmethane, benzoylacetone, tribenzoylmethane, diacetylacetobenzene, stearoylacetophenone, palmitoylacetophenone, lauroylacetophenone, p-methoxy stearoylacetophenone, stearoylbenzoylmethane, acetoacetic esters, acetylacetone, 1,1-diacetylacetone, triacetylmethane, stearoylacetone, palmitoylacetone, lauroylacetone, stearoyloctanone, heptane 2,4-dione, decane-2,4-dione, ethyl nonane-2,4-dionecarboxylate, 8-methylnona-7-ene-2,4-dione, 1-benzoyloctan-2-one, 2-methyldecan-2-ene-6,8-dione, methylene-2,2'-bis(cyclohexane-1,3-dione), 1,4-diphenylbutane-1,3-dione, 1-phenyl-2-allyl-1,3-butanedione, benzoylacetaldehyde, 2-methyl-2-acetylacetaldehyde, dehydroacetic acid, dehydroacetates and so on.

The aforesaid organic phosphorous esters include, among others, triaryl phosphites such as triphenyl phosphite, tris(p-nonylphenyl)phosphite, etc.; alkyl aryl phosphites, for example monoalkyl diphenyl phosphites such as diphenyl isooctyl phosphite, diphenyl isodecyl phosphite, etc. and dialkyl monophenyl phosphites such as phenyl diisooctyl phosphite, phenyl diisodecyl phosphite, etc.; and trialkyl phosphites such as triisooctyl phosphite, tristearyl phosphite and so on.

The aforesaid aminocarboxylic acid compounds include, among others, aminocarboxylic compounds such as glycine, alanine, lysine, triptophan, acetylglutamic acid, acetylphenylalanine, acetylmethionine, pyrrolidonecarboxylic acid, β-aminocrotonic acid, α-aminoacrylic acid, α-aminoadipic acid, etc. and the corresponding esters. The alcohol components of such esters include, among others, monohydric alcohols such as methanol, ethanol, propanol, isopropyl alcohol, butanol α-ethylhexanol, octanol, isooctyl alcohol, lauryl alcohol, stearyl alcohol, etc. and polyhydric alcohols such as ethylene glycol, propylene glycol, 1,3-butanediol, 1,4-butanediol, glycerol, diglycerol, trimethylolpropane, pentaerythritol, dipentaerythritol, sorbitol, mannitol and so on.

Compound (E)

As compound (E), use is made of at least one compound selected from the group consisting of phenol derivatives and epoxy compounds.

The aforesaid phenol derivatives include, among others, 2,5-di-t-butylhydroquinone, 2,6-di-t-butyl-p-cresol, 4,4'-thiobis(6-t-butylphenol), 2,2'-methylene-bis(4-metyl-6-t-butylphenol), tetrakis[methylene-3-(3',5'-di-t-butyl-4'-hydroxyphenyl)propionate]methane, octadecyl 3-(3',5'-di-t-butyl-4'-hydroxyphenyl)propionate, 4,4'-thiobis(6-t-butylphenol), N,N'-hexamethylene-bis3,5-di-t-butyl-4-hydroxyhydrocinnamide) and so on.

The aforesaid epoxy compounds include, among others, various animal or vegetable oils such as epoxidized soybean oil, epoxidized linseed oil, epoxidized fish oil, epoxidized beef tallow oil, etc., epoxidized fatty acid esters such as epoxidized methyl stearate, epoxidized butyl stearate, etc., epoxidized alicyclic compounds such as epoxidized butyl tetrahydrophthalate, epoxidized octyl tetrahydrophthalate, etc.; glycidyl ethers or esters such as bisphenol A diglycidyl ether, glycidyl methacrylate and its polymer, etc., and epoxy-containing high polymers such as epoxidized polybutadiene, epoxidized acrylonitrilebutadiene rubber and so on.

Formation

The proportions of the above-mentioned various components based on 100 parts by weight of said halogen-containing thermoplastic resin (A) are as follows.

Metallic Soap (B)

0.1 to 5 and preferably 0.5 to 4 parts by weight

Ethylene-Vinyl Acetate Copolymer Hydrolysate (C)

0.1 to 5 and preferably 0.2 to 4 parts by weight

Compound (D)

0 to 5, preferably 0.05 to 5, and for still better results, 0.1 to 3 parts by weight

Compound (E)

0 to 5, preferably 0.01 to 5, and for still better results, 0.01 to 4 parts by weight In the above formulation, the weight ratio of ethylene-vinyl acetate copolymer hydrolysate (C) to metalic soap (B) [(C)/(B)] is preferably within the range of 0.05 to 2 and, for better results, within the range of 0.1 to 1.

If either (B) or (C) is absent or the ratio deviates from the above range, the desired degree of improvement in thermal stability will hardly be obtained.

While the effect of the invention can be well implemented by addition of (B) and (C) to (A), the further addition of (D) or (D) plus (E) contributes to a further improvement in thermal stability.

Other Additives

In the halogen-containing thermoplastic resin composition of the invention, there may be further incorporated, as necessary, various additives known for incorporation in halogen-containing thermoplastic resin compositions, such as plasticizers, dyes and pigments, fillers, lubricating agents, antistatic agents, surfactants, chelating agents, reinforcing materials, foaming agents, impact resistance improving agents (ethylene- vinyl acetate copolymer, acrylic copolymer, ABS resin, MBS resin, etc.) and so on. It is also possible to incorporate antioxidants, ultraviolet absorbers and other auxiliary stabilizers (e.g. polyols, hydrotalcite compounds of the general formula $M_xAl_y(OH)_{2x+3y-2z}(E)_z \cdot aH_2O$ wherein $M=Mg$, Ca or Zn; $E=CO_3$ or $HPO_3$; x, y and z each is a positive integer; a is equal to zero or means a positive integer). Furthermore, within limits not contrary to the objects of the invention, other thermoplastic resins may also be incorporated in the halogen-containing thermoplastic resin composition of the invention.

A plasticizer such as phthalic acid esters, aliphatic dibasic acid esters, trimellitic acid esters, phosphate esters, fatty acid esters, epoxy plasticizers, polyester type plasticizers, paraffin chloride, may be added in appropriate proportions relative to halogen-containing thermoplastic resin (A). In the stabilizing effect of said various additives according to the invention on resin (A), such a plasticizer plays a significant part, and this stabilizing effect is pronounced when the plasticizer is added in a proportion up to about 40 parts by weight based. gn 100 parts by weight of (A).

Melt-Molding

As melt-molding technologies compatible with the halogen-containing thermoplastic resin composition of the invention, calendering, extrusion molding, injection molding, blow molding and other processes may be mentioned by way of example.

Thus, in accordance with the present invention, the thermal stability (stability against initial coloration, discoloration on aging and blackening) of halogen-containing thermoplastic resin (A) can be markedly improved by addition of said metallic soap (B) and ethylene-vinyl acetate copolymer hydrolysate (C), preferably together with said compound (D) or (E) or said compounds (D) and (E) at the defined levels. As to the roles played by these additives, the metallic soap (B) is supposed to act as a stabilizer and the ethylene-vinyl acetate copolymer hydrolysate (C), compound (D) and compound (E) as auxiliary stabilizers.

The composition of the invention shows no plate-out phenomena during calendering and permits extrusion molding in a long run. Moreover, the resulting moldings are free of discoloration.

Therefore, the present invention is a remarkable contribution to the industry engaged in the molding of polyvinyl chloride and other halogen-containing thermoplastic resins.

EXAMPLES

The following examples are further illustrative of the composition of the invention. In the examples, all 'parts' and '%' are by weight unless otherwise indicated and the water used is invariably deionized water.

Ethylene-vinyl Acetate Copolymer Hydrolysate (C)

An ash- and alkali-lean ethylene-vinyl acetate copolymer hydrolysate (C) was prepared as follows.

(C-0)

An ethylene-vinyl acetate copolymer with an ethylene content of 44 mole % was dissolved in methanol to give a 40% solution and 1,000 parts of the solution was fed to a pressure-resistant reactor, in which it was heated at 110° C. with stirring. Then, 40 parts of a 6% solution of sodium hydroxide in methanol and 2,500 parts of methanol were continuously fed to the reactor and the hydrolysis reaction was conducted for 2.5 hours, with the byproduct methyl acetate and excess methanol being constantly distilled out from the reaction system. The procedure gave an ethylene-vinyl acetate copolymer hydrolysate with a degree of saponification of the vinyl acetate unit being 99.5 mole %.

After completion of the hydrolysis reaction, 450 parts of 30% aqueous methanol was introduced and the excess methanol was distilled off to give a 39% solution in water-methanol (3:7).

This solution, held at 50° C., was extruded, in the form of strands, through a nozzle (orifice diameter 4 mm) into a water-methanol (9:1) coagulation bath (100 mm wide, 4,000 mm long, 100 mm deep; maintained at 5° C.) at a rate of 1.5 l/hr. After coagulation, the strands were taken up on a roll disposed at one side of the coagulation bath at a linear speed of 2 m/min. and cut with a cutter to give white, porous pellets 4 mm in diameter and 4 mm in length.

The above pellets of ethylene-vinyl acetate copolymer hydrolysate had an ash content of 7,400 ppm and a sodium metal content of 4,800 ppm.

This ethylene-vinyl acetate copolymer hydrolysate is designated as (C-0).

(C-1)

In 300 parts of 0.3% aqueous acetic acid were immersed 100 parts of the above pellets (C-0) for washing with stirring for 1 hour at 30° C. This procedure (weak acid treatment) was repeated twice. The slurry was then filtered and 300 parts of water were added to the pellets again. The resulting slurry was stirred at 30° C. for 1 hour. This rinse was repeated 3 times and the rinsed pellets were dried.

The above rinsed pellets of ethylene-vinyl acetate copolymer hydrolysate had an ash content of 6 ppm and a sodium metal content of 2.7 ppm.

This ethylene-vinyl acetate copolymer hydrolysate was designated as (C-1).

(C-2)

Prior to the above rinse procedure, the (C-1) pellets washed with weak acid as above were subjected to a strong acid treatment using 230 parts of a 0.003% aqueous solution of phosphoric acid under stirring at 30° C. for 1 hour and, then, subjected to 3 cycles of rinse as in the case of production of (C-1), followed by drying.

The resulting pellets of ethylene-vinyl acetate copolymer hydrolysate had an ash content of 10 ppm and a sodium metal content of 1.4 ppm.

This ethylene-vinyl acetate copolymer hydrolysate was designated as (C-2).

(C-3)

The pellets (C-0) were washed in the same manner as in the preparation of (C-1) but the number of washing cycles was reduced to give the following pellets.

(C-3a)

An ethylene-vinyl acetate copolymer hydrolysate with an ash content of 41 ppm and a sodium metal content of 26 ppm.

(C-3b)

An ethylene-vinyl acetate copolymer hydrolysate with an ash content of 152 ppm and a sodium metal content of 96 ppm.

(C-3c)

An ethylene-vinyl acetate copolymer hydrolysate with an ash content of 252 ppm and a sodium metal content of 153 ppm.

(C-3d)

An ethylene-vinyl acetate copolymer hydrolysate with an ash content of 415 ppm and a sodium metal content of 305 ppm.

(C-4)

The pellets (C-0) mentioned above were washed in the same manner as in the preparation of (C-1) except that the acetic acid concentration of the weak acid bath was reduced to give pellets of an ethylene-vinyl acetate copolymer hydrolysate having an ash content of 240 ppm and a sodium metal content of 170 ppm. This ethylene-vinyl acetate copolymer hydrolysate was designated as (C-4).

(C-5)

To a mixed solution of 1,950 parts of methanol, 925 parts of water, 182 parts of sodium hydroxide and 38 parts of acetone was added 1,124 parts of a suspension-polymerized ethylene-vinyl acetate copolymer (ethylene content 71 mole %, water content 11.0%) and the hydrolysis reaction was conducted at 30° C. for 3 hours and, then, at 35° C. for a further 3 hours, with constant stirring. The resulting slurry was centrifuged.

Then, 100 parts of the copolymer hydrolysate thus separated was mixed with 300 parts of a 1% aqueous solution of acetic acid and stirred at 30° C. for 1 hour. This washing procedure was repeated twice.

The slurry was then filtered and the resulting polymer was immersed in 300 parts of a 0.5% aqueous solution of phosphoric acid and stirred at 30° C. for 1 hour. This strong acid washing procedure was carried out once.

The slurry was then filtered and the resulting resin was mixed with 300 parts of water and stirred at 30° C. for 1 hour. This rinse procedure was repeated 3 times, after which the resin was dried in vacuo at room temperature.

The resulting ethylene-vinyl acetate copolymer hydrolysate had a saponification degree of 61.2 mole %, an ash content of 15 ppm and a sodium metal content of 4.0 ppm.

This ethylene-vinyl acetate copolymer hydrolysate was designated as (C-5).

(C-6)

After the hydrolysis reaction conducted as in the preparation of (C-5), the resulting slurry was centrifuged and the primary saponification product thus obtained was added to a mixed solution of 2,000 parts of methanol, 500 parts of water, 200 parts of sodium hydroxide and 38 parts of acetone and stirred at 30° C for 2 hours, then at 35° C. for 2 hours, and finally at 40° C. for 2 hours for secondary saponification. The slurry was then centrifuged.

As in the case of (C-5), the resin was subjected to weak acid treatment, strong acid treatment and rinse procedure and dried in vacuo at room temperature.

The resulting ethylene-vinyl acetate copolymer hydrolysate had a saponification degree of 91.0 mole %, an ash content of 45 ppm and a sodium metal content of 21 ppm.

The above ethylene-vinyl acetate copolymer hydrolysate was designated as (C-6).

The assays of ashes and sodium metal were carried out as follows.

Ashes

About 80 g of each dried sample was accurately weighed and a portion (about 10 g) was put in a calibrated platinum evaporating dish and carbonized with an electric heater. This procedure was repeated with increments of about 10 g of the sample. Finally, the carbonized sample was incinerated in the flame of a gas burner until smokes ceased to emerge.

The above platinum evaporating dish was placed in an electric furnace at about 400° C. and, with the dish mostly covered up with a porcelain crucible cover, the furnace temperature was gradually increased to 700° C. This temperature was maintained for 3 hours for complete reduction to ash and the sample was then taken out from the furnace and allowed to cool for 5 minutes. It was further allowed to stand in a desiccator for 25 minutes and the ashes were accurately weighed.

Sodium Metal

About 10 g of each dried sample was accurately weighed into a platinum crucible and reduced to ash in the same manner as above. The platinum crucible was charged with 2 ml of special reagent grade hydrochloric acid and 3 ml of pure water and the sample was dissolved by heating with an electric heater. Using purified water, the solution was flushed into a 50 ml measuring flask and deionized water was further added up to the marked line for preparation of a sample for atomic absorption spectrometry.

Using a separately prepared standard solution (sodium metal 1 ppm, HCl approx. 0.5 N) as blank, atomic absorption spectrometry was carried out and the amount of sodium metal was estimated from the absorbance ratio. The instrument parameters were as follows.

Instrument: Hitachi Model 180-30 atomic absorption/flame spectrophotometer
Wavelength: 589.0 nm
Flame: acetylene-air Compound (D)

As examples of compound (D), the following compounds were provided.
(D-1): dehydroacetic acid
(D-2): stearoylbenzoylmethane
(D-3): dibenzoylmethane
(D-4): diphenyl isodecyl phosphite
(D-5): diphenyl isooctyl phosphite
(D-6): triphenyl phosphite
(D-7): 1,4-butanediol bis-β-aminocrotonate
(D-8): stearyl β-aminocrotonate
(D-9): acetylglutamic acid Compound (E)

As examples of compound (E), the following compounds were provided.

(E-1): tetrakis[methylene-3-(3',5'-di-t-butyl-4'-hydroxyphenyl)propionate]methane (Irganox 1010, Ciba-Geigy)
(E-2): N,N'-hexamethylene-bis(3,5-di-t-butyl-4-hydroxyhydrocinnamide) (Irganox 1098, Ciba-Geigy)
(E-3): octadecyl 3-(3',5'-di-t-butyl-4'-hydroxyphenyl)propionate (Irganox 1076, Ciba-Geigy)
(E-4): bisphenol A diglycidyl ether
(E-5): epoxidized soybean oil
(E-6): epoxidized linseed oil

EXAMPLES 1 TO 10; COMPARATIVE EXAMPLES 1 TO 9

| | |
|---|---|
| Polyvinyl chloride with a degree of polymerization = 800 (A) | 100 Parts |
| Dioctyl phthalate (plasticizer) | 20 Parts |
| Calcium stearate (B) | 1 Part |
| Zinc stearate (B) | 1 Part |
| Ethylene-vinyl acetate copolymer hydrolysate (C), to be described hereinafter | As mentioned hereinafter |
| Compound (D), to be described hereinafter | As mentioned hereinafter |
| Compound (E), to be described hereinafter | As mentioned hereinafter |

The above composition was subjected to preliminary mixing and, then, kneading by means of a 6"(dia.)×12" roll at 170° C. for 5 minutes to give a 0.5 mm thick sheet.

From this sheet, a 50×60 mm testpiece was cut out and allowed to stand in a gear oven at 180° C. for testing its thermal stability.

The results are shown in Table 1. The evaluation of thermal stability was made according to the following 9-point schedule.
1: colorless
2: pale pink or pale yellow
3: pale orange
4: light pink
5: light orange
6: yellow-orange
7: orange
8: black spots
9: black

EXAMPLE 1

(C) component: (C-1), 0.5 Part
(D) component: (D-1), 0.3 Part

EXAMPLE 2

(C) component: (C-1), 0.5 Part
(D) component: (D-4), 0.3 Part

EXAMPLE 3

(C) component: (C-1), 0.5 Part
(D) component: (D-7), 0.3 Part

EXAMPLE 4

(C) component: (C-1), 0.5 Part
(D) component: (D-1), 0.3 Part
(E) component: (E-1), 0.1 Part

EXAMPLE 5

(C) component: (C-1), 0.5 Part
(D) component: (D-4), 0.3 Part
(E) component: (E-2), 0.1 Part

EXAMPLE 6

(C) component: (C-1), 0.5 Part
(D) component: (D-7), 0.3 Part
(E) component: (E-3), 0.1 Part

EXAMPLE 7

(C) component: (C-1), 0.5 Part
(D) component: Not added
(E) component: Not added

EXAMPLE 8

(C) component: (C-1), 0.5 Part
(D) component: Not added
(E) component: (E-1), 0.1 Part

EXAMPLE 9

(C) component: (C-1), 0.5 Part
(D) component: Not added
(E) component: (E-2), 0.1 Part

EXAMPLE 10

(C) component: (C-1), 0.5 Part
(D) component: Not added
(E) component: (E-3), 0.1 Part

COMPARATIVE EXAMPLE 1

(C) component: Not added
(D) component: Not added
(E) component: Not added

COMPARATIVE EXAMPLE 2

(C) component: (C-0), 0.5 Part
(D) component: Not added
(E) component: Not added

COMPARATIVE EXAMPLE 3

(C) component: Not added
(D) component: (D-1), 0.3 Part
(E) component: Not added

COMPARATIVE EXAMPLE 4

(C) component: Not added
(D) component: (D-4), 0.3 Part
(E) component: Not added

COMPARATIVE EXAMPLE 5

(C) component: Not added
(D) component: (D-7), 0.3 Part
(E) component: Not added

COMPARATIVE EXAMPLE 6

(C) component: Not added
(D) component: (D-1), 0.3 Part
(E) component: (E-1), 0.1 Part

COMPARATIVE EXAMPLE 7

(C) component: Not added
(D) component: (D-4), 0.3 Part
(E) component: (E-2), 0.1 Part

COMPARATIVE EXAMPLE 8

(C) component: Not added
(D) component: (D-7), 0.3 Part
(E) component: (E-3), 0.1 Part

EXAMPLES 11 TO 16

Using the following formulas, sheets were manufactured and tested for thermal stability in otherwise the same manner as Examples 1 to 10.

| | |
|---|---|
| Polyvinyl chloride with a degree of polymerization = 800 (A) | 100 Parts |
| Dioctyl phthalate (plasticizer) | 20 Parts |
| Barium stearate (B) | 1 Part |
| Zinc laurate (B) | 1 Part |
| Ethylene-vinyl acetate copolymer hydrolysate (C), to be described hereinafter | As mentioned hereinafter |
| Compound (D), to be described hereinafter | As mentioned hereinafter |
| Compound (E), to be described hereinafter | As mentioned hereinafter |

The results are also shown in Table 1. The evaluation of thermal stability was made in the same manner as above, using the same 9-point rating schedule.

EXAMPLE 11

(C) component: (C-2), 1.0 Part
(D) component: (D-2), 0.4 Part
(E) component: (E-1), 0.2 Part

EXAMPLE 12

(C) component: (C-3a), 1.0 Part
(D) component: (D-5), 0.4 Part
(E) component: (E-1), 0.2 Part

EXAMPLE 13

(C) component: (C-4), 1.0 Part
(D) component: (D-8), 0.4 Part
(E) component: (E-1), 0.2 Part

EXAMPLE 14

(C) component: (C-2), 1.5 Part
(D) component: (D-3), 0.5 Part
(E) component: (E-4), 0.5 Part

EXAMPLE 15

(C) component: (C-3a), 1.5 Part
(D) component: (D-6), 0.5 Part
(E) component: (E-5), 3.0 Part

EXAMPLE 16

(C) component: (C-5), 2.5 Part
(D) component: (D-9), 0.5 Part
(E) component: (E-6), 3.0 Part

EXAMPLE 17

| | |
|---|---|
| Vinylidene chloride-methyl acrylate copolymer (methyl acrylate content 7 mole %) | 100 Parts |
| Dioctyl phthalate (plasticizer) | 20 Parts |
| Calcium stearate (B) | 1 Part |
| Zinc stearate (B) | 2 Parts |
| Ethylene-vinyl acetate copolymer hydrolysate (C-1) | 1 Part |
| (D-7) | 0.3 Part |
| (E-1) | 0.1 Part |

The above composition was extruded into a 0.5 mm thick sheet and a testpiece thereof allowed to stand in a gear oven at 170° C. for testing its thermal stability.

The extrusion-molding conditions were as follows.
Extruder: 40 mm (dia.)
Screw: L/D 23, compression ratio 3.2
Cylinder temperature (MAX): 170° C.
Head temperature: 170° C.
Die temperature: 170° C.
The results are shown in Table 1.

EXAMPLES 18 AND 19; COMPARATIVE EXAMPLE 9

The procedure of Example 17 was repeated except that the formulation was varied as follows. The results are also shown in Table 1.

EXAMPLE 18

(C) component: (C-1), 1.0 Part
(D) component: Not added
(E) component: (E-1), 0.1 Part

EXAMPLE 19

(C) component: (C-1), 1.0 Part
(D) component: (D-7), 0.3 Part
(E) component: Not added

COMPARATIVE EXAMPLE 9

(C) component: Not added
(D) component: (D-7), 0.3 Part
(E) component: (E-1), 0.1 Part

EXAMPLE 20

| | |
|---|---|
| Chlorinated polyethylene (Cl content 40%) | 100 Parts |
| Dioctyl phthalate (plasticizer) | 20 Parts |
| Triazine type vulcanizer | 1 Part |
| Mercaptobenzothiazole type accelerator | 2 Parts |
| Calcium stearate (B) | 1 Part |
| Zinc stearate (B) | 2 Parts |
| Ethylene-vinyl acetate copolymer hydrolysate (C-2) | 1 Part |
| (D-1) | 0.3 Part |
| (E-5) | 3 Parts |

The above composition was molded (kneading by roll at 140° C. for 5 min.; vulcanizing at 160° C. for 20 min.) to give a 1 mm thick sheet.
The sheet was allowed to stand in a gear oven at 170° C. for a thermal stability test.
The results are shown in Table 1.

EXAMPLES 21 AND 22; COMPARATIVE EXAMPLE 10

Using the following formulations, sheets were manufactured in otherwise the same manner as Example 20.

EXAMPLE 21

(C) component: (C-2), 1.0 Part
(D) component: Not added
(E) component: (E-5) 3.0 Parts

EXAMPLE 22

(C) component: (C-2), 1.0 Part
(D) component: (D-1), 0.3 Part
(E) component: Not added

COMPARATIVE EXAMPLE 10

(C) component: Not added
(D) component: (D-1), 0.3 Part
(E) component: (E-5), 3.0 Parts

TABLE 1

(Result of evaluation of thermal stability)

| | Time (minutes) | | | | | | | | | |
|---|---|---|---|---|---|---|---|---|---|---|
| | 0 | 10 | 20 | 30 | 40 | 50 | 60 | 80 | 100 | 120 |
| Example 1 | 1 | 1-2 | 2 | 3 | 3 | 9 | | | | |
| Example 2 | 1 | 1-2 | 2 | 3 | 5 | 9 | | | | |
| Example 3 | 1 | 1-2 | 2 | 3 | 3 | 9 | | | | |
| Example 4 | 1 | 1-2 | 2 | 2 | 2 | 3 | 3 | 7 | 9 | |
| Example 5 | 1 | 1-2 | 2 | 2 | 3 | 3 | 3 | 8 | 9 | |
| Example 6 | 1 | 1-2 | 2 | 2 | 2 | 3 | 3 | 5 | 9 | |
| Example 7 | 1 | 2 | 3 | 3 | 9 | | | | | |
| Example 8 | 1-2 | 3-4 | 3 | 3 | 5 | 5 | 5 | 6 | 9 | |
| Example 9 | 1-2 | 3 | 3 | 3 | 3 | 5 | 5 | 6 | 9 | |
| Example 10 | 1-2 | 3-4 | 3 | 3 | 5 | 5 | 5 | 6 | 9 | |
| Example 11 | 1 | 1-2 | 1-2 | 2 | 2 | 3 | 3 | 3 | 5 | 7 |
| Example 12 | 1 | 1-2 | 2 | 2 | 2 | 3 | 3 | 5 | 7 | 9 |
| Example 13 | 1 | 1-2 | 2 | 2 | 3 | 3 | 3 | 5 | 6 | 9 |
| Example 14 | 1 | 1-2 | 2 | 2 | 3 | 3 | 3 | 5 | 6 | 7 |
| Example 15 | 1 | 1-2 | 2 | 2 | 2 | 3 | 3 | 5 | 5 | 6 |
| Example 16 | 1 | 1-2 | 2 | 2 | 2 | 3 | 3 | 5 | 5 | 6 |
| Example 17 | 1 | 1 | 1-2 | 2 | 3 | 3 | 5 | 9 | | |
| Example 18 | 1 | 2 | 3 | 3 | 5 | 5 | 7 | 9 | | |
| Example 19 | 1 | 1 | 2 | 3 | 5 | 9 | | | | |
| Example 20 | 1 | 1 | 2 | 2 | 3 | 3 | 3 | 9 | | |
| Example 21 | 1 | 2 | 2 | 3 | 3 | 5 | 5 | 9 | | |
| Example 22 | 1 | 1 | 2 | 2 | 3 | 9 | | | | |
| Comparative Example 1 | 1-2 | 9 | | | | | | | | |
| Comparative Example 2 | 4-5 | 5 | 7 | 7 | 9 | | | | | |
| Comparative Example 3 | 1 | 2 | 8 | 9 | | | | | | |
| Comparative Example 4 | 1 | 2 | 8 | 9 | | | | | | |
| Comparative Example 5 | 1 | 2 | 8 | 9 | | | | | | |
| Comparative Example 6 | 1 | 2 | 8 | 9 | | | | | | |
| Comparative Example 7 | 1 | 2 | 8 | 9 | | | | | | |
| Comparative Example 8 | 1 | 2 | 8 | 9 | | | | | | |
| Comparative Example 9 | 1 | 7 | 9 | | | | | | | |
| Comparative Example 10 | 1 | 2 | 5 | 9 | | | | | | |

EXAMPLE 23

A composition consisting of 100 parts of polyvinyl chloride (degree of polymerization=800), 20 parts of dioctyl phthalate (plasticizer), 1 part of calcium stearate, 2 parts of zinc stearate, and 1 part of said ethylene-vinyl acetate copolymer hydrolysate (C-1; auxiliary stabilizer) was subjected to preliminary mixing and then, kneading using a 6"(dia.)×12" roll at 170° C. for 5 minutes to provide a 0.5 mm thick sheet.
In the course of kneading, the development of plate-out phenomenon was monitored. From the resulting sheet, a 50×60 mm testpiece was cut out and allowed to stand in a gear oven at 170° C. for a thermal stability test.

EXAMPLES 24 TO 28

Sheets were manufactured and tested in the same manner as in Example 23 except that in lieu of 1 part of ethylene-vinyl acetate copolymer hydrolysate (C-1), 1 part of (C-2) (Example 24), 1 part of (C-3a) (Example 25), 1 part of (C-3b) (Example 26), 1 part of (C-3c) (Example 27) or 0.5 part of (C-1) (Example 28) was used.

COMPARATIVE EXAMPLE 11

The procedure of Example 23 was repeated except that the auxiliary stabilizer was omitted from the formulation of Example 23.

COMPARATIVE EXAMPLE 12

The procedure of Example 23 was repeated except that 1 part of ethylene-vinyl acetate copolymer hydrolysate (C-3d) was used as the auxiliary stabilizer.

COMPARATIVE EXAMPLE 13 TO 15

The procedure of Example 23 was repeated except that 1 part of finely divided pentaerythritol (Comparative Example 13), 1 part of triphenyl phosphite (Comparative Example 14) or 1 part of epoxidized soybean oil (Comparative Example 15) was used as the auxiliary stabilizer.

COMPARATIVE EXAMPLE 16

The procedure of Example 23 was repeated except that calcium stearate was used in a proportion of 0.05 part, the addition of zinc stearate omitted, and 1 part of ethylene-vinyl acetate copolymer hydrolysate (C-3d) used as the auxiliary stabilizer.

COMPARATIVE EXAMPLE 17

The procedure of Example 23 was repeated except that 1 part of polyvinyl alcohol with a degree of polymerization of 600 and a saponification degree of 99 mole % was used as the auxiliary stabilizer.

EXAMPLES 29 AND 30

The procedure of example 23 was repeated except that 1 part of ethylene-vinyl acetate copolymer hydrolysate (C-5) (Example 29) or 1 part of ethylene-vinyl acetate copolymer hydrolysate (C-6) (Example 30) was used as the auxiliary stabilizer.

The results obtained in Examples 23 to 30 and Comparative Examples 11 to 17 are shown in Table 2.

The evaluation of plate-out was made according to the following 4-grade rating schedule.
◉No plate-out
∘Substantially no plate-out
ΔSlight plate-out
x Marked plate-out The initial coloration was evaluated at 15 minutes after commencement of heating.

TABLE 2

| | Thermal stability | | | |
|---|---|---|---|---|
| | Blackening begins (min.) | Complete Blackening (min.) | Initial discoloration | Plate-out |
| Example 23 | 60 | 70 | Nil | ◉ |
| Example 24 | 60 | 70 | Nil | ◉ |
| Example 25 | 55 | 65 | Pale orange | ◉-∘ |
| Example 26 | 50 | 60 | Light orange | ∘ |
| Example 27 | 50 | 60 | Light orange | ∘ |
| Example 28 | 30 | 40 | Nil | ◉ |
| Example 29 | 60 | 65 | Nil | ◉-∘ |
| Example 30 | 55 | 60 | Pale orange | ◉-∘ |
| Comparative Example 11 | <10 | 15 | Nil | ◉ |
| Comparative Example 12 | 50 | 60 | Orange | Δ |

TABLE 2-continued

| | Thermal stability | | | |
|---|---|---|---|---|
| | Blackening begins (min.) | Complete Blackening (min.) | Initial discoloration | Plate-out |
| Example 12 Comparative Example 13 | >80 | >80 | Nil | x |
| Comparative Example 14 | 30 | 50 | Nil | Δ |
| Comparative Example 15 | Sudden blackening after 30 min. | 30 | Light orange | Δ |
| Comparative Example 16 | (Browning) <10 | (Browning) 15 | Brown | Δ |
| Comparative Example 17 | <10 | 15 | Orange | Δ |

EXAMPLE 31

A composition consisting of 100 parts of vinylidene chloride-methyl acrylate copolymer (methyl acrylate content 7 mole %), 10 parts of dioctyl phthalate, 1 part of calcium stearate, 2 parts of zinc stearate and 1 part of ethylene-vinyl acetate copolymer hydrolysate (C-1) was extrusion-molded and the resulting 0.5 mm thick sheet was allowed to stand in a gear oven at 170° C. for testing its thermal stability.

The extrusion conditions were as follows.
Extruder: 40 mm (dia.)
Screw: L/D 23, compression ratio 3.2
Cylinder temperature (MAX): 170° C.
Head temperature: 170° C.
Die temperature: 170° C.

The thermal stability test showed a complete blackening time of 30 minutes.

Where the addition of (C-1) was omitted, the control sample underwent complete blackening in 10 minutes.

EXAMPLE 32

A composition consisting of 100 parts of chlorinated polyethylene (Cl content 40%), 30 parts of dioctyl phthalate, 1 part of triazine type vulcanizing agent, 2 parts of mercaptobenzothiazole type vulcanization accelerator, 1 part of calcium stearate, 2 parts of zinc stearate and 1 part of ethylene-vinyl acetate copolymer hydrolysate (C-1) was molded (kneading by roll at 140° C. for 5 min.; vulcanizing at 160° C. for 20 min.) to give a 1 mm thick sheet.

This sheet was subjected to a thermal stability test in a gear oven at 180° C. The complete blackening time was 30 minutes.

On the other hand, the control sample free of (C-1) showed a complete blackening time of 10 minutes.

What is claimed is:

1. A halogen-containing thermoplastic resin composition comprising a halogen-containing thermoplastic resin (A), a metallic soap (B), an ash- and alkali metal-lean ethylene-vinyl acetate copolymer hydrolysate (C) having an ethylene content of 20 to 75 mole percent, a degree of saponification not less than 50 mole percent, an ash content not exceeding 300 ppm and an alkali metal content not exceeding 200 ppm, at least one compound (D) selected from the group consisting of β-diketone compounds and organic phosphorous esters and aminocarboxylic acid compounds, and at least one compound (E) selected from the group consisting of phenol derivatives and epoxy compounds, the proportions of (B), (C), (D) and (E) based on 100 parts by weight of (A) being 0.1 to 5 parts by weight, 0.1 to 5 parts by weight, 0.05 to 5 parts by weight, and 0.01 to 5 parts by weight, respectively.

* * * * *